US010685677B1

(12) United States Patent
Lee et al.

(10) Patent No.: US 10,685,677 B1
(45) Date of Patent: Jun. 16, 2020

(54) DISC GRABBING APPARATUS WITH DIFFERENT STATES FOR CARRYING AND RELEASING DISC

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Chao Lee, Taipei (TW); Dong-Lin Jhong, Taipei (TW); Chien-Hsun Chen, Taipei (TW); Ming-Chun Tsao, Taipei (TW)

(73) Assignees: LITE ON ELECTRONICS (GUANGZHOU) LIMITED (CN); LITE ON TECHNOLOGY CORPORATION (TW)

( * ) Notice: Subject to any disclaimer, the term of this patent is extended or adjusted under 35 U.S.C. 154(b) by 0 days.

(21) Appl. No.: 16/660,065

(22) Filed: Oct. 22, 2019

(30) Foreign Application Priority Data

Mar. 22, 2019 (CN) .......................... 2019 1 0220806

(51) Int. Cl.
*G11B 17/18* (2006.01)
*B65H 3/24* (2006.01)
*B65H 3/32* (2006.01)

(52) U.S. Cl.
CPC .............. *G11B 17/18* (2013.01); *B65H 3/24* (2013.01); *B65H 3/32* (2013.01); *B65H 2601/2531* (2013.01); *B65H 2601/273* (2013.01)

(58) Field of Classification Search
CPC ... G11B 17/0284; G11B 17/08; G11B 17/054; G11B 17/18; F16H 37/065; B65H 3/32; B65H 3/24; B65H 2601/273; B65H 2601/2531
See application file for complete search history.

(56) References Cited

U.S. PATENT DOCUMENTS

| 5,829,739 A * | 11/1998 | Hofmann | G11B 5/84 269/43 |
| 6,233,218 B1 * | 5/2001 | Hoffmann | G11B 17/22 369/30.77 |
| 6,459,673 B1 * | 10/2002 | Becker | G11B 17/22 369/178.01 |
| 6,959,444 B2 * | 10/2005 | Peng | G11B 17/26 720/615 |
| 8,695,025 B2 * | 4/2014 | Tokuda | G11B 17/10 720/615 |

(Continued)

*Primary Examiner* — Brian E Miller
(74) *Attorney, Agent, or Firm* — Innovation Counsel LLP (57) ABSTRACT

A disc grabbing apparatus includes a body, a first rod and a second rod. The body includes a central shaft. The first rod includes a pushing portion and a first supporting portion sequentially disposed from top to bottom. The second rod includes a first groove and a second supporting portion sequentially disposed from top to bottom. The first and second rods define a disc region with respect to the central shaft. When the first rod and the second rod are in a first state, the pushing portion is located outside the disc region and the groove faces away from the disc region; when the first rod and the second rod rotate to a second state from the first state in a first rotation direction, the pushing portion is located within the disc region and the first groove faces the disc region.

17 Claims, 13 Drawing Sheets

(56) References Cited

U.S. PATENT DOCUMENTS

| | | | | |
|---|---|---|---|---|
| 10,008,235 B1* | 6/2018 | Chang | ................... | G11B 17/08 |
| 10,210,897 B1* | 2/2019 | Chang | ............... | G11B 17/0284 |
| 10,262,687 B1* | 4/2019 | Chang | ................... | F16H 37/065 |
| 10,388,316 B2* | 8/2019 | Chang | ................... | G11B 17/08 |
| 10,388,317 B2* | 8/2019 | Chang | ............... | G11B 17/0284 |
| 10,504,549 B2* | 12/2019 | Chang | ................... | G11B 17/22 |
| 2004/0210918 A1* | 10/2004 | Peng | ...................... | G11B 17/26 |
| | | | | 720/623 |
| 2010/0100895 A1* | 4/2010 | Hernandez | ............ | G11B 17/08 |
| | | | | 720/703 |
| 2013/0326548 A1* | 12/2013 | Chihara | .............. | G11B 17/053 |
| | | | | 720/615 |
| 2019/0027185 A1* | 1/2019 | Chang | ................. | G11B 17/053 |

* cited by examiner

DISC GRABBING APPARATUS WITH DIFFERENT STATES FOR CARRYING AND RELEASING DISC

This application claims the benefit of People's Republic of China application Serial No. 201910220806.4, filed on Mar. 22, 2019, the subject matter of which is incorporated herein by reference.

FIELD OF THE INVENTION

The invention relates to a grabbing apparatus, and more particularly to a disc grabbing apparatus.

BACKGROUND OF THE INVENTION

Currently, the disc grabbing apparatus first clamps the opposite two edges of the optical disc above the bottommost optical disc before placing the bottommost optical disc on the optical disc drive, so as to prevent multiple optical discs from dropping to the optical disc drive at one time. However, in the manner of clamping the optical disc, the opposite two edges of the optical disc are easily damaged. In addition, a bonding force between the disc surface of the bottommost optical disc and the disc surface of the adjacent optical disc is possible to make the bottommost optical disc be difficult to fall naturally, and it results in failure in disc separating process. Therefore, how to propose a new disc grabbing apparatus to avoid damage the optical disc and smooth disc separating process is one of the goals of the industry.

SUMMARY OF THE INVENTION

In one embodiment of the invention, a disc grabbing apparatus is provided. The disc grabbing apparatus includes a body, a first rod and a second rod. The body includes a central shaft. The first rod includes a pushing portion and a first supporting portion which are sequentially disposed from top to bottom. The second rod includes a first groove and a second supporting portion which are sequentially disposed from top to bottom. The first rod and the second rod define a disc region therebetween with respect to the central shaft which is inserted into a disc center hole. When the first rod and the second rod are in a first state, the pushing portion is located outside the disc region and the first groove faces away from the disc region; when the first rod and the second rod rotate to a second state from the first state in a first rotational direction, the pushing portion is located within the disc region and the first groove faces the disc region.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1A:
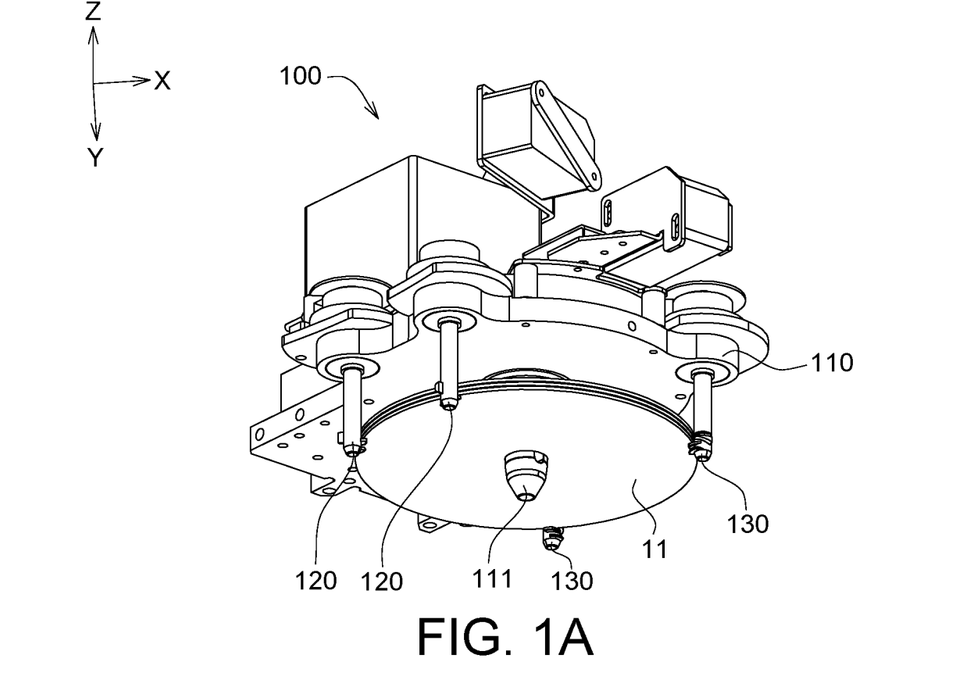
FIGS. 1A to 1C are schematic diagrams showing an appearance of the disc grabbing apparatus in a first state according to an embodiment of the invention.
Figure 1B:
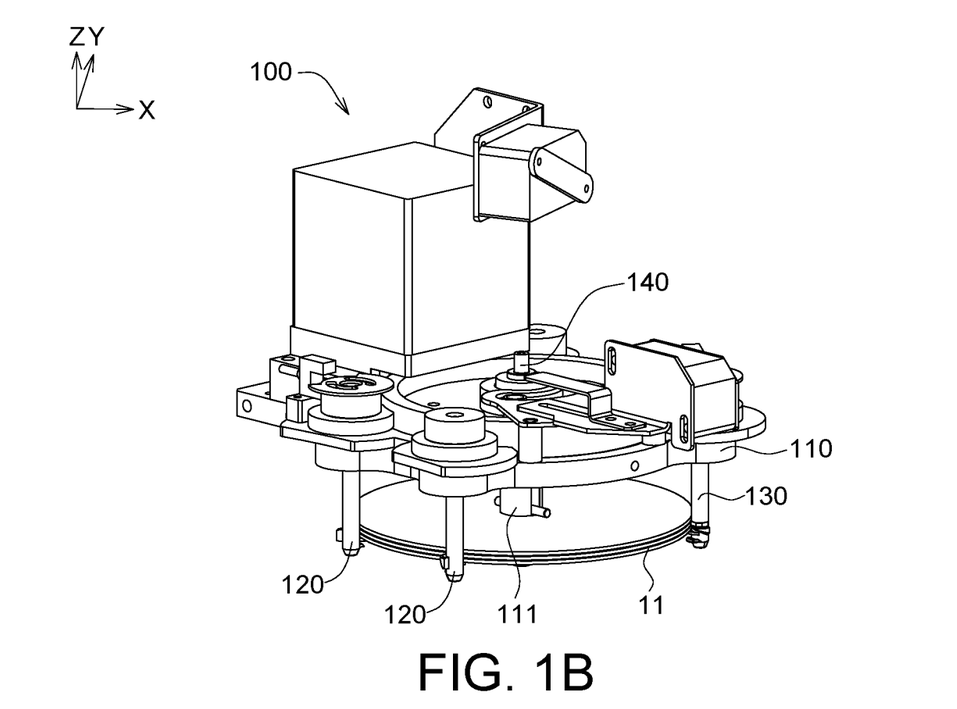
Figure 1C:
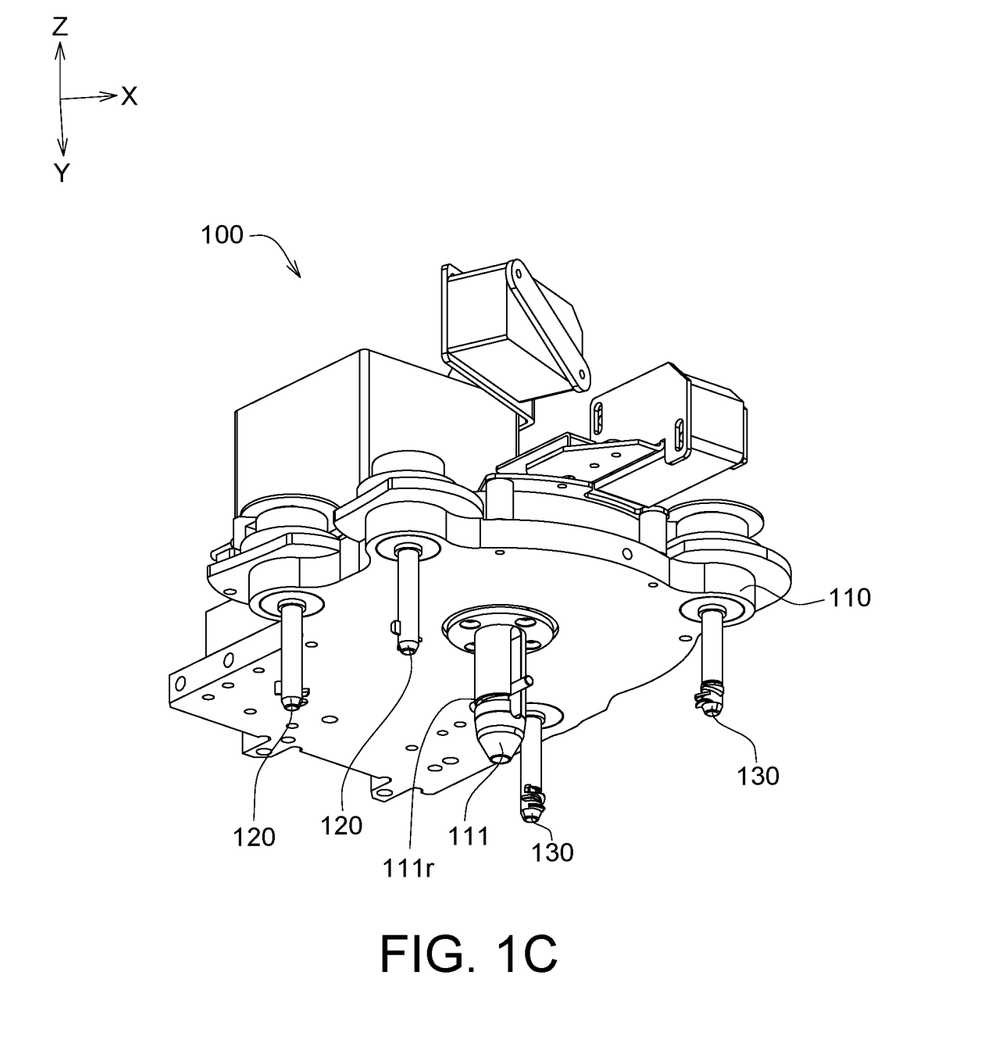
Figure 1D:
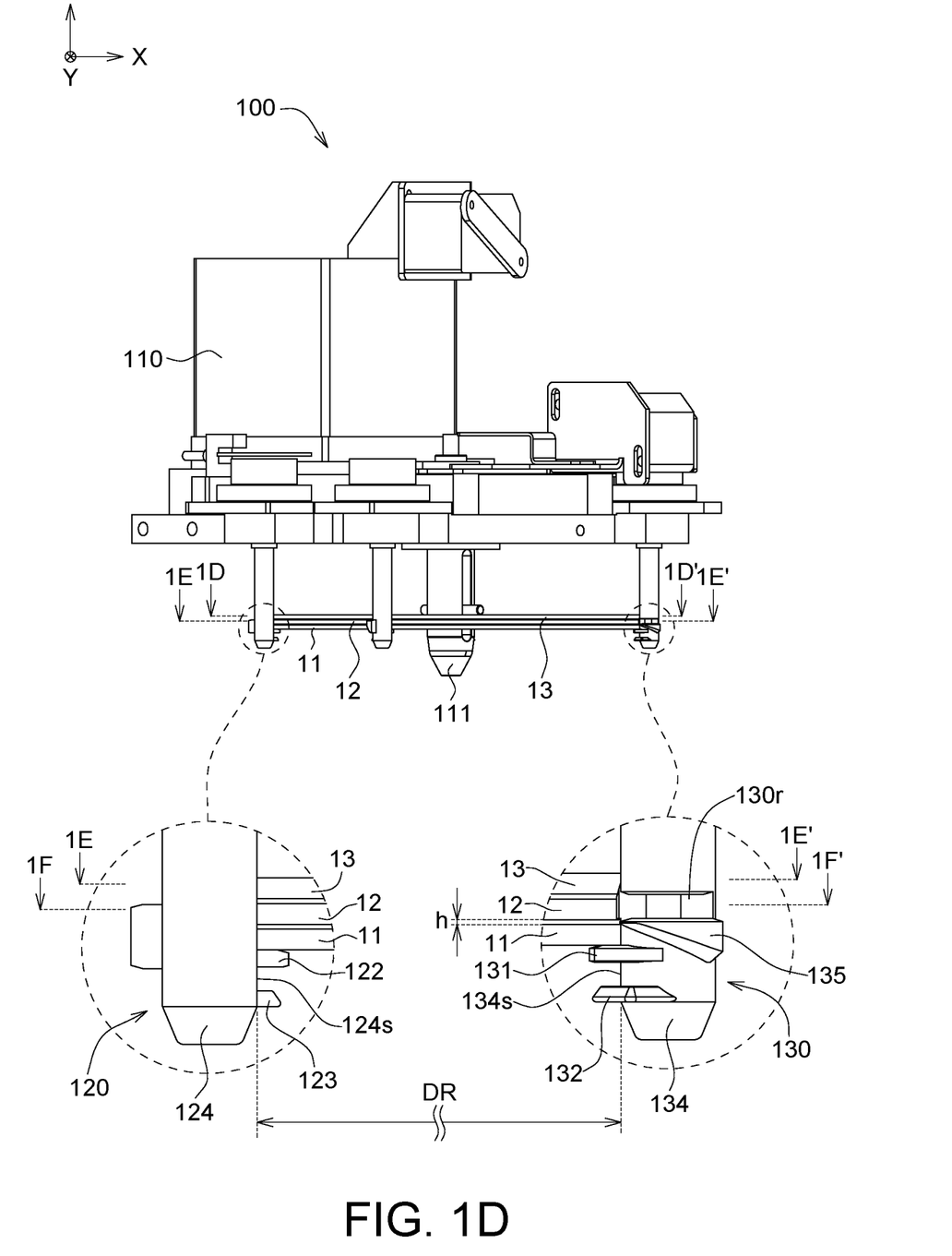
FIG. 1D is a side view of the disc grabbing apparatus of FIG. 1B.
Figure 1E:
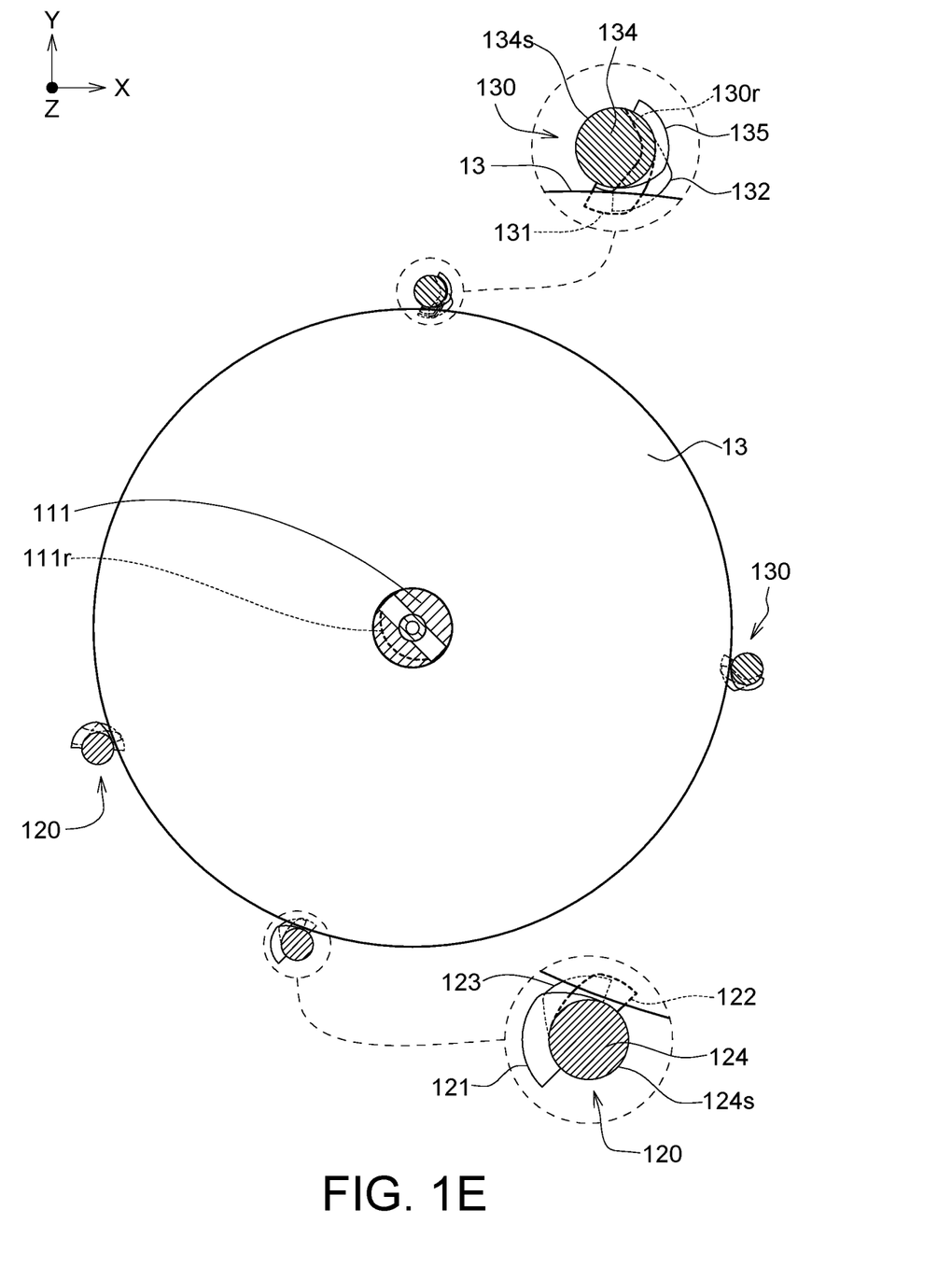
FIG. 1E is a cross-sectional view of the disc grabbing apparatus of FIG. 1D along a direction 1E-1E'.
Figure 1F:
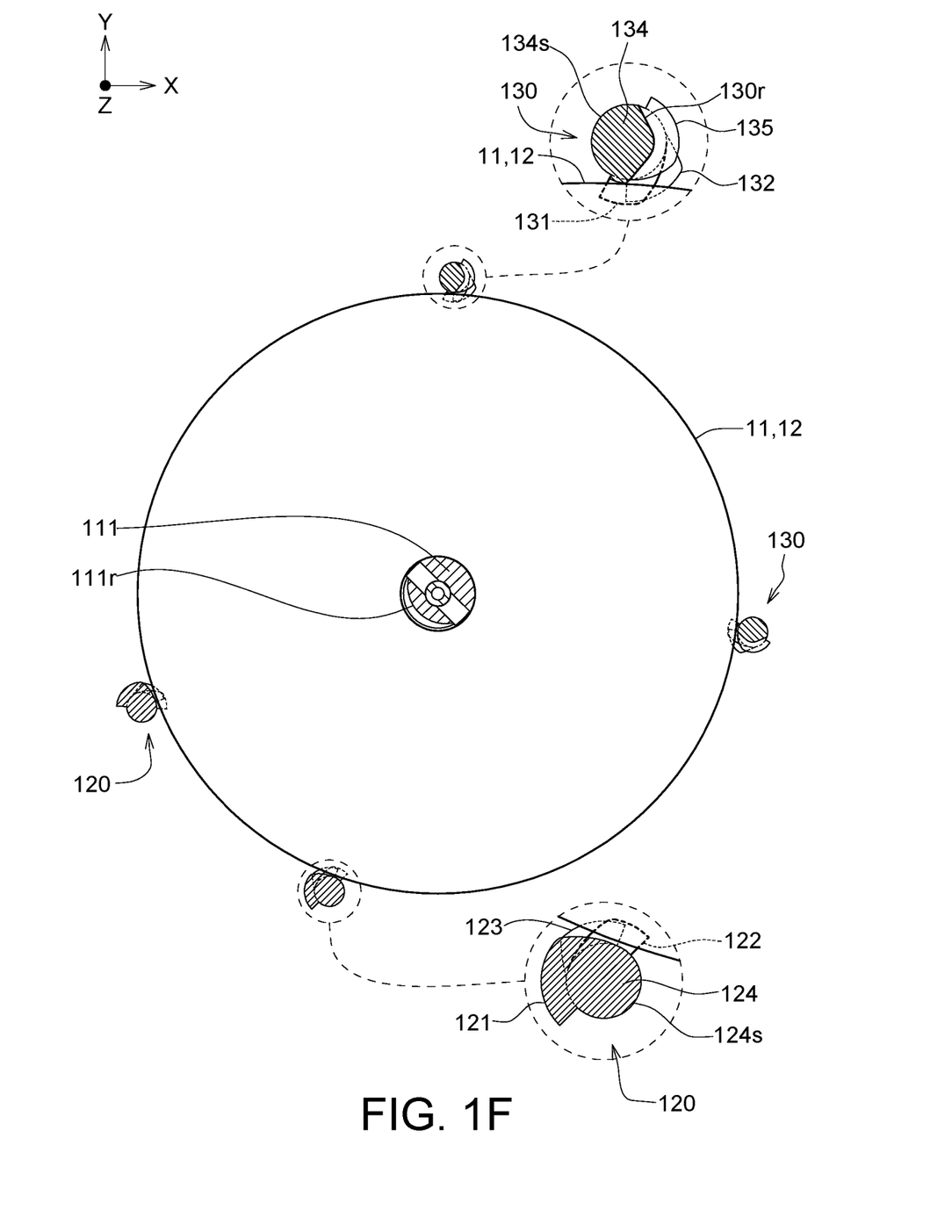
FIG. 1F is a cross-sectional view of the disc grabbing apparatus of FIG. 1D along a direction 1F-1F'.
Figure 2A:
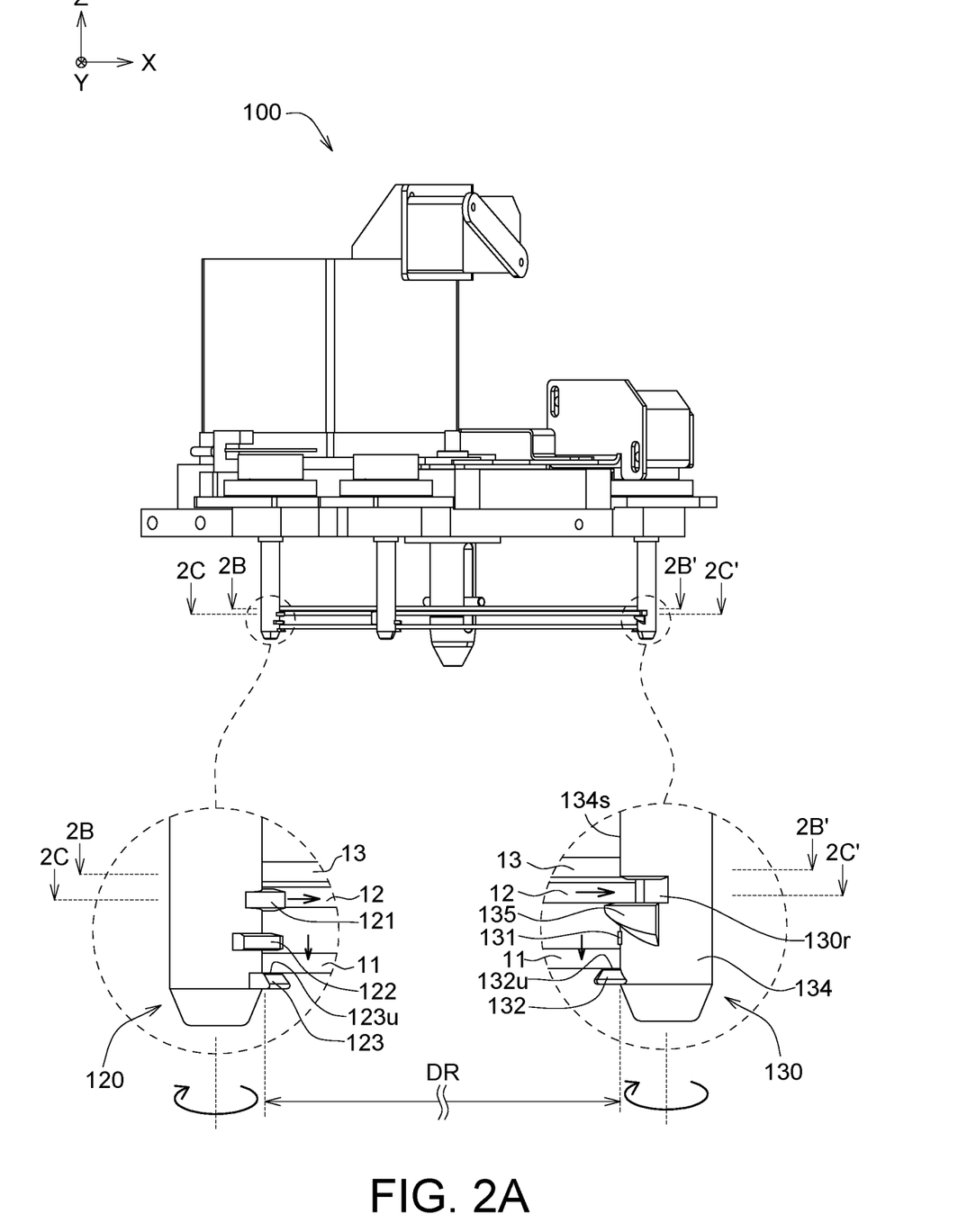
FIG. 2A is a schematic diagram showing an appearance of the disc grabbing apparatus in a second state according to an embodiment of the invention.
Figure 2B:
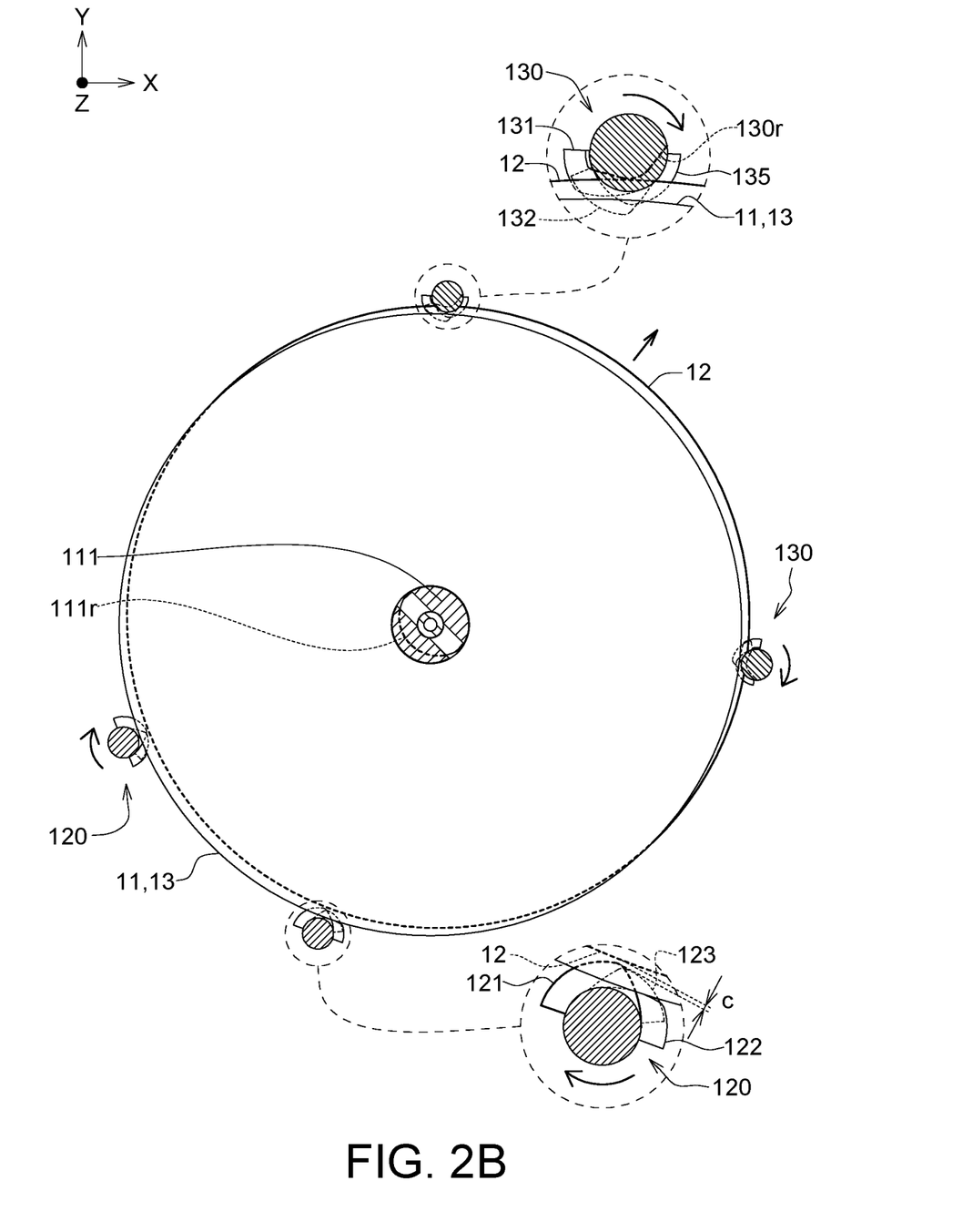
FIG. 2B is a cross-sectional view of the disc grabbing apparatus of FIG. 2A along a direction 2B-2B'.
Figure 2C:
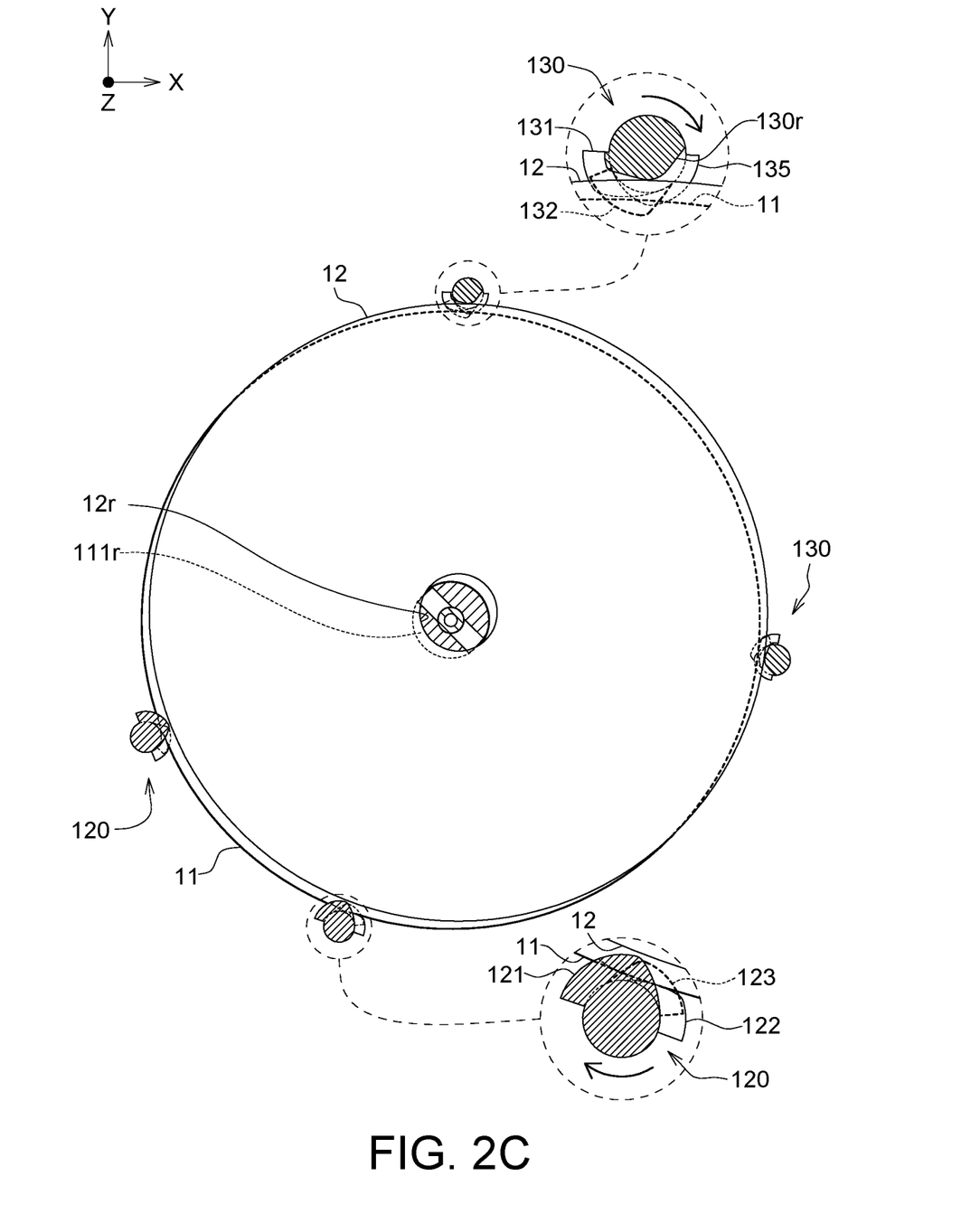
FIG. 2C is a cross-sectional view of the disc grabbing apparatus of FIG. 2A along a direction 2C-2C'.

Referring to FIGS. 1A to 1F and 2A to 2C, FIGS. 1A to 1O are schematic diagrams showing an appearance of the disc grabbing apparatus 100 in a first state according to an embodiment of the invention (FIG. 1O does not illustrates an optical disc). FIG. 1D is a side view of the disc grabbing apparatus 100 of FIG. 1B. FIG. 1E is a cross-sectional view of the disc grabbing apparatus 100 of FIG. 1D along a direction 1E-1E'. FIG. 1F is a cross-sectional view of the disc grabbing apparatus 100 of FIG. 1D along a direction 1F-1F'. FIG. 2A is a schematic diagram showing an appearance of the disc grabbing apparatus 100 in a second state according to an embodiment of the invention. FIG. 2B is a cross-sectional view of the disc grabbing apparatus 100 of FIG. 2A along a direction 2B-2B', and FIG. 2C is a cross-sectional view of the disc grabbing apparatus 100 of FIG. 2A along a direction 2C-2C'. The illustrated XY plane is substantially parallel to the disc plane, while the Z axis is substantially parallel to a central shaft 111 of a body 110.

As illustrated in FIGS. 1A to 1D, the disc grabbing apparatus 100 includes the body 110, two first rods 120, two second rods 130 and a driving mechanism 140. The first rods 120 and the second rods 130 are connected to the body 110 and extended downward from the body 110, wherein the two first rods 120 are disposed adjacent to each other, and the two second rods 130 are disposed adjacent to each other.

The body 110 includes the central shaft 111, and each second rod 130 and each first rod 120 are disposed substantially equidistant with respect to the central shaft 111. Each first rod 120 includes a pushing portion 121, a first supporting portion 122 and a third supporting portion 123 which are disposed from top to bottom (toward the −Z axis). Each second rod 130 includes a first groove 130r, a second supporting portion 131 and a fourth supporting portion 132 which are disposed from top to bottom. The first rod 120 and the second rod 130 define a disc region DR with respect to the central shaft 111. As illustrated in FIGS. 1A to 1D, at least one disc, such as discs 11, 12 and 13 may be located within the disc region DR from bottom to top. Each of the discs 11, 12 and 13 has a center hole (not illustrated) to allow the central shaft 111 to pass through. In another embodiment, the number of the discs may be less than three, such as one or two, or more than three, such as four or more. In an embodiment, the discs are, for example, optical discs. The shape and size of the disc region DR are the same or similar to the shape and size of each disc.

As illustrated in FIGS. 1A to 1D, each first rod 120 further includes a first rod body 124, wherein the pushing portion 121, the first supporting portion 122 and the third supporting portion 123 are disposed on the first rod body 124 and are projected with respect to a peripheral surface 124s of the first rod body 124. Each second rod 130 further includes a second rod body 134, wherein the first groove 130r is recessed with respect to a peripheral surface 134s of the second rod body 134, while the second supporting portion 131 and the fourth supporting portion 132 are disposed on the second rod body 134 and projected with respect to the peripheral surface 134s of the second rod body 134. In one embodiment, the pushing portion 121, the first supporting portion 122, the third supporting portion 123, and the first rod body 124 are, for example, integrally formed into one piece, and/or the second supporting portion 131, the fourth supporting portion 132 and the second rod body 134 are, for example, integrally formed into one piece. The upper surfaces of the first supporting portion 122, the third supporting portion 123, the second supporting portion 131 and the fourth supporting portion 132 are in contact with the lower surface of the disc to grab the disc located within the disc region DR rather than holding an outer edge of the disc. Accordingly, the disc grabbing apparatus 100 does not damage the disc. The carrying surfaces of the first supporting portion 122 and the second supporting portion 131 that are in contact with the disc are substantially coplanar, such as a horizontal plane or substantially parallel to the XY plane.

As illustrated in FIGS. 1A to 1D, the driving mechanism 140 could drive the first rods 120 and the second rods 130 to rotate synchronously to push and/or separate the disc 11 located within the disc region DR. Here, "push disc" refers to the action of pushing the disc into the first groove 130r, and "separate disc" refers to the action of releasing the disc to make the disc drop on the tray of the optical disc drive. Although not illustrated, the driving mechanism 140 may include a motor and a gear set, wherein the gear set is connected to the first rods 120 and the second rods 130, and the motor is connected to the gear set to drive the gear set to rotate for driving the first rods 120 and the second rods 130 to rotate synchronously. For example, the first rods 120 and the second rods 130 are driven to rotate clockwise or counterclockwise.

As illustrated in FIGS. 1E and 1F, when the first rod 120 and the second rod 130 are in the first state, the first supporting portion 122 (illustrated as thick lines) and the second supporting portion 131 (illustrated as thick lines) are located within the disc region DR for carrying the discs, for example, the bottommost disc 11 (illustrated as thick lines) of all discs, so that all of the discs including the disc 11 and the discs above the disc 11 are prevented from being dropping from the disc grabbing apparatus 100.

As illustrated in FIGS. 2A to 2C, during the process of the first rod 120 and the second rod 130 rotating to the second state (as the state illustrated in FIGS. 2A to 2C) from the first state (as the state illustrated in FIGS. 1A to 1F) in the first rotational direction, the pushing portion 121 (illustrated as thick lines in FIG. 2B) is rotated to be located within the disc region DR from being outside the disc region DR, and the pushing portion 121 is in contact with the outer edge of the disc 12 to push the disc 12 to move toward the first groove 130r (illustrated as thick lines in FIG. 2B), while the first groove 130r is rotated to face the disc region DR from facing away from the disc region DR for receiving the outer edge of the disc 12. As a result, even if the first supporting portion 122 and the second supporting portion 131 release the disc 11 located within the disc region DR, the disc 12 located above the disc 11 does not drop to the third supporting portion 123 and the fourth supporting portion 132. Furthermore, due to the disc 12 is restrained between the pushing portion 121 and the first groove 130r, the disc 13 located above the disc 12 does not drop from the disc grabbing apparatus 100. The aforementioned first rotational direction is, for example, a clockwise direction.

In addition, as illustrated in FIGS. 2B and 2C, the pushing portion 121 could block the disc 12 from being detached from the first groove 130r along the XY plane. Furthermore, as illustrated in FIG. 2B, as long as the pushing portion 121 could block the disc 12 from being detached from the first groove 130r along the XY plane, the pushing portion 121 and the outer edge of the disc 12 could have a gap c (the gap c is shown in FIG. 2B). In another embodiment, the pushing portion 121 could abut on the outer edge of the disc 12, that is, the gap c does not exist. In addition, the outer edge of the disc 12 and the side wall of the first groove 130r may have similar gaps therebetween, and details are not described herein.

As illustrated in FIG. 2A, each second rod 130 further includes a separating portion 135 connected to the second rod body 134. The separating portion 135 has a wedge shape with a tip end. The first groove 130r, the separating portion 135, the second supporting portion 131 and the fourth supporting portion 132 are sequentially disposed from top to bottom. The separating portion 135 projects with respect to the first groove 130r. For example, the separating portion 135 projects with respect to the peripheral surface 134s of the second rod body 134. During the process of the first rod 120 and the second rod 130 rotating to the second state from the first state, the separating portion 135 is rotated to be located within the disc region DR from being outside the disc region DR, and the tip end of the separating portion 135 is inserted to the gap h between the disc 11 and the disc 12 to separate the disc 11 from the disc 12. The separating portion 135 and the pushing portion 121 are not coplanar, and when the separating portion 135, the pushing portion 121, and the first groove 130r are rotated to the second state from the first state, the disc 11 is separated from the disc 12.

As illustrated in FIGS. 2A to 2C, during the process of the first rod 120 and the second rod 130 rotating to the second state from the first state, the first supporting portion 122 and the second supporting portion 131 are rotated to be outside the disc region DR from being located within the disc region DR for releasing the disc 11 located within the disc region DR, such that the disc 11 drops, along the direction of the arrow, to the lower third supporting portion 123 and the fourth supporting portion 132. When the first rod 120 and the second rod 130 are in the second state, the third supporting portion 123 (illustrated as thick lines in FIG. 2C) and the fourth supporting portion 132 (illustrated as thick lines in FIG. 2C) are located within the disc region DR for carrying the disc 11 which is released from the first supporting portion 122 and the second supporting portion 131. Accordingly, the disc 11 could be prevented from dropping from the disc grabbing apparatus 100.

The third supporting portion 123 and the fourth supporting portion 132 have a first carrying surface 123u and a second carrying surface 132u, respectively. The first carrying surface 123u is substantially coplanar with the second carrying surface 132u, such as a horizontal plane or substantially parallel to the XY plane. Since the disc 11 is adjusted to be level on the first carrying surface 123*u* of the third supporting portion 123 and the second carrying surface 132*u* of the fourth supporting portion 132 before dropping to the tray 21 of the optical disc drive 20 (as the step illustrated in FIG. 3A), the disc 11 is allowed to stably drop to the tray 21.

In summary, the disc grabbing apparatus 100 of the embodiment of the invention pushes the outer edge of the disc 12 into the first groove 130*r*, and thus the problem of the outer edge of the disc 12 being damaged due to clamping does not occur.

As illustrated in FIGS. 10, 1E, 1F, 2B, and 2C, the central shaft 111 has a second groove 111*r*. When the first rod 120 and the second rod 130 are in the second state, as illustrated in FIG. 2C, the second groove 111*r* faces the pushing portion 121 to receive an inner edge of the center hole 12*r* of the disc 12. In detail, the second groove 111*r* provides a receiving space for the disc 12, such that the second groove 111*r* could receive the inner edge of the center hole 12*r* and the first groove 130*r* could receive the outer edge of the disc 12 when the disc 12 is pushed by the pushing portion 121 toward the second groove 111*r* and the first groove 130*r*.

Comparing FIG. 1D with FIG. 2A, during the process of the first rod 120 and the second rod 130 rotating to the second state from the first state, due to the pushing portion 121 pushing the disc 12 toward the first groove 130*r*, and the tip end of the separating portion 135 is inserted into the gap h between the disc 11 and the disc 12, the disc 11 and the disc 12 are staggered (or shifted) from each other along the XY plane. As a result, a bonding force (such as electrostatic force) between the disc 12 and the disc 11 could be reduced, such that the disc 11 could be easily dropped onto the second supporting portion 131 and the fourth supporting portion 132. In detail, as illustrated in FIG. 1D, the gap h between the adjacent disc 11 and the disc 12 is very small, so that the bonding force between the disc surface of the disc 11 and the disc surface of the disc 12 is generated, wherein such bonding force makes the disc 11 and the disc 12 difficult to separate. However, as described above, due to the disc 11 and the disc 12 being staggered (or shifted) from each other, the bonding force between the disc 11 and the disc 12 could be reduced, and thus the disc 11 could be easily dropped to the third supporting portion 123 and the fourth supporting portion 132.

Figure 3A:
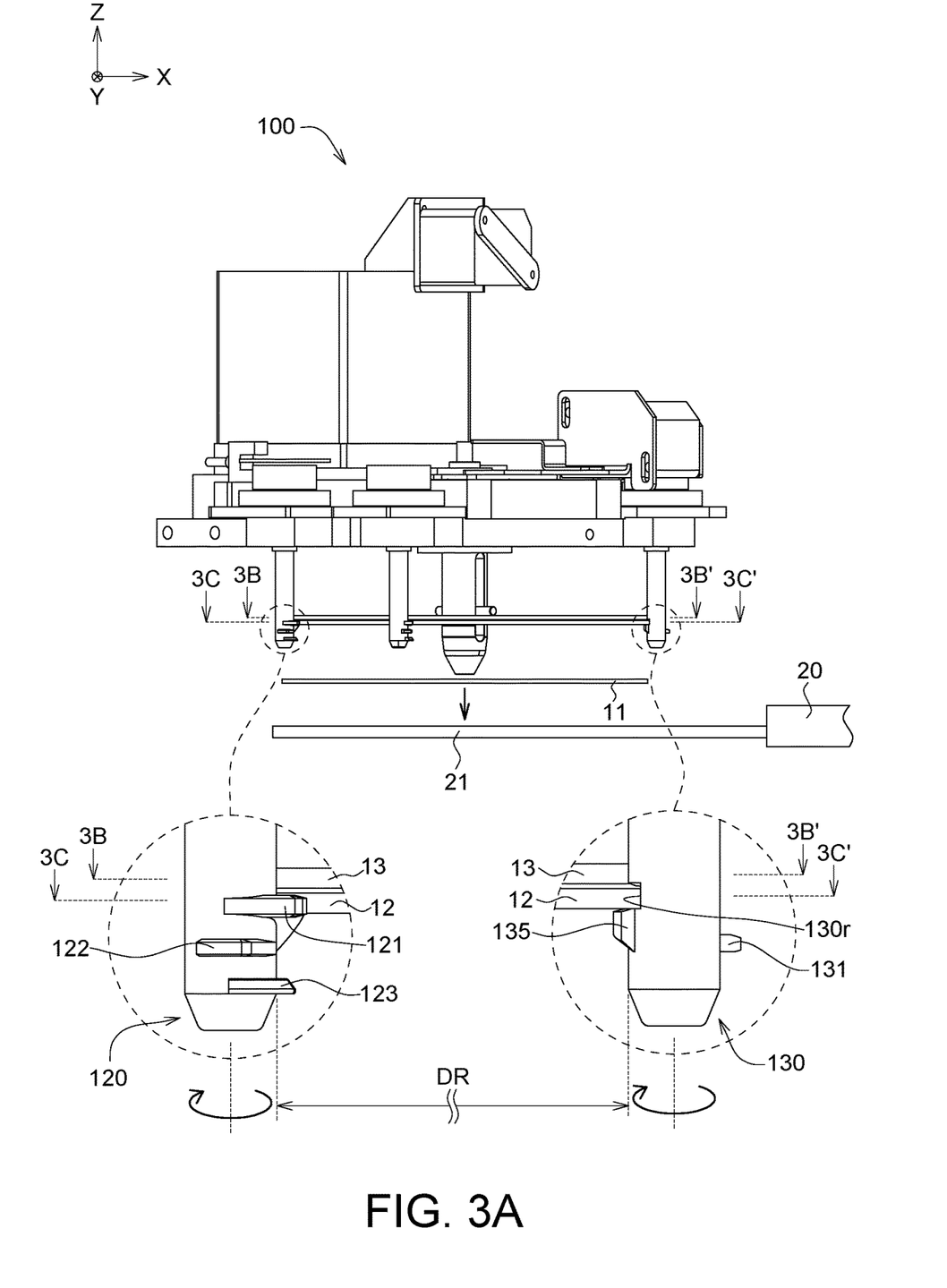
FIG. 3A is a schematic diagram showing an appearance of the disc grabbing apparatus in a third state according to an embodiment of the invention.
Figure 3B:
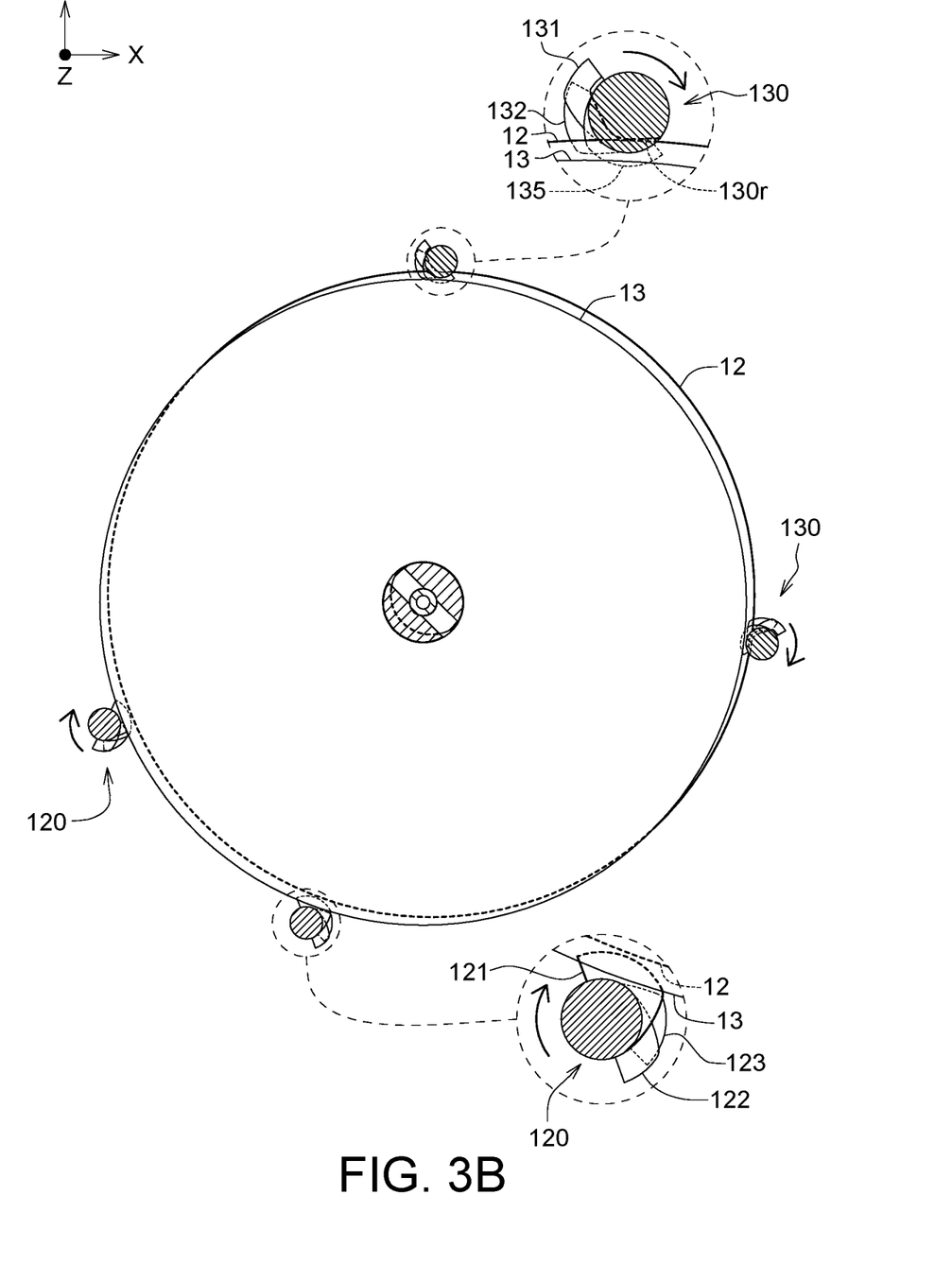
FIG. 3B is a cross-sectional view of the disc grabbing apparatus of FIG. 3A along a direction 3B-3B'.
Figure 3C:
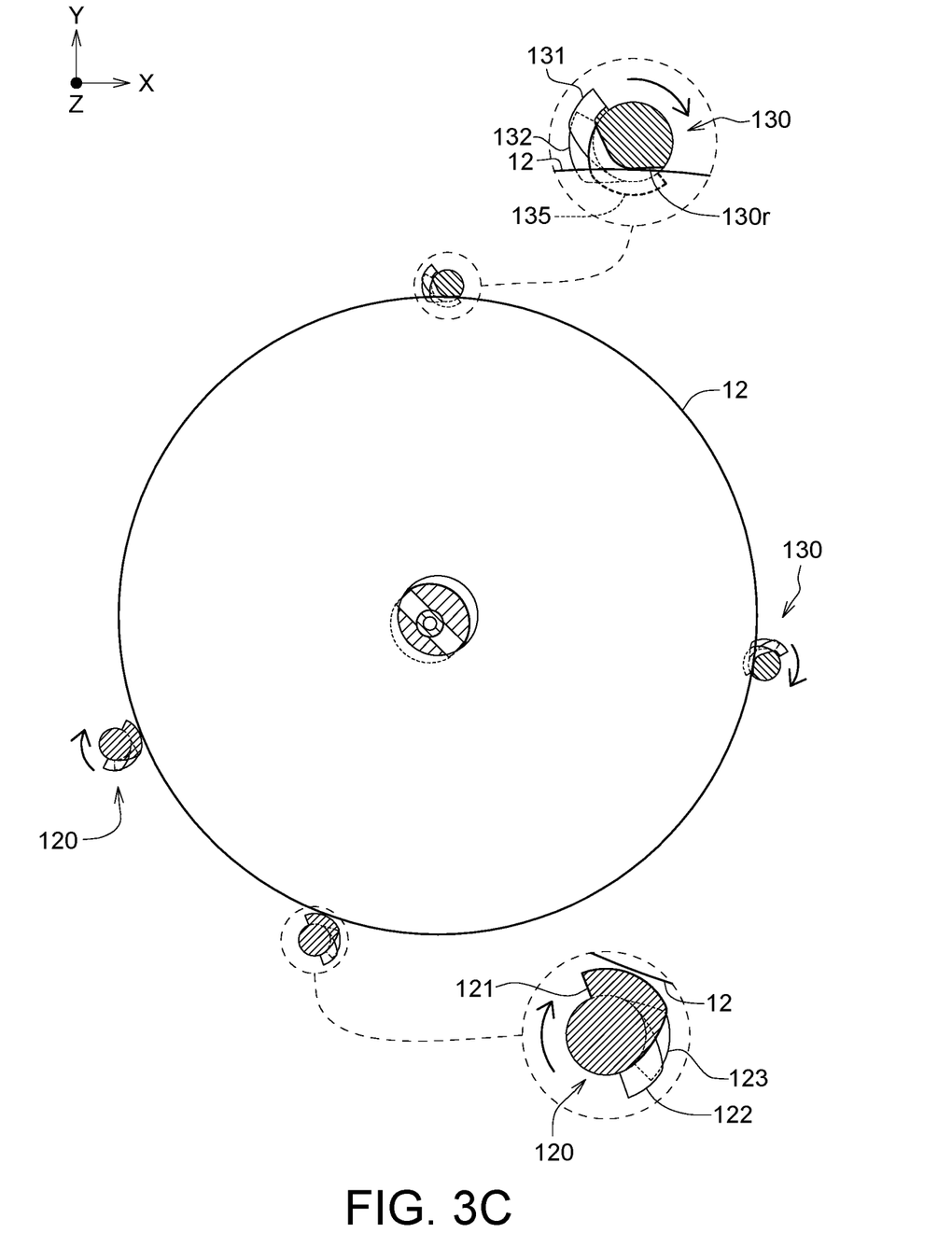
FIG. 3C is a cross-sectional view of the disc grabbing apparatus of FIG. 3A along a direction 3C-3C'.

Referring to FIGS. 3A to 3C, FIG. 3A is a perspective view of the disc grabbing apparatus 100 in the third state according to an embodiment of the invention, FIG. 3B is a cross-sectional view of the disc grabbing apparatus 100 of FIG. 3A along a direction 3B-3B', and FIG. 3C is a cross-sectional view of the disc grabbing apparatus 100 of FIG. 3A along a direction 3C-3C'.

As illustrated in FIGS. 3A to 3C, when the first rod 120 and the second rod 130 rotate to a third state (the state illustrated in FIGS. 3A to 3C) from the second state in the first rotational direction, the third supporting portion 123 and the fourth supporting portion 132 are rotated to be outside the disc region DR from being inside the disc region DR for releasing the disc 11 located thereon, as illustrated in FIG. 3A. The released disc 11 is dropped onto the tray 21 of the optical disc drive 20 as illustrated in FIG. 3A. In addition, when the first rod 120 and the second rod 130 are in the third state, the pushing portion 121 is located within the disc region DR and the first groove 130*r* faces the disc region DR to continuously restrain the disc 12 between the first groove 130*r* and the pushing portion 121. Accordingly, the disc 12 could be prevented from falling down.

After the disc 11 is placed on the tray 21, the tray 21 is retracted into the optical disc drive 20 to spare room for the disc grabbing apparatus 100 to move along the Z-axis to a corresponding position of another optical disc drive 20 for delivering the disc 12 to the tray 21 of such another optical disc drive 20. Of course, depending on practical design requirements, the disc grabbing apparatus 100 could also be moved along the X-axis or the Y-axis to the corresponding position of such another optical disc drive 20.

Figure 4:
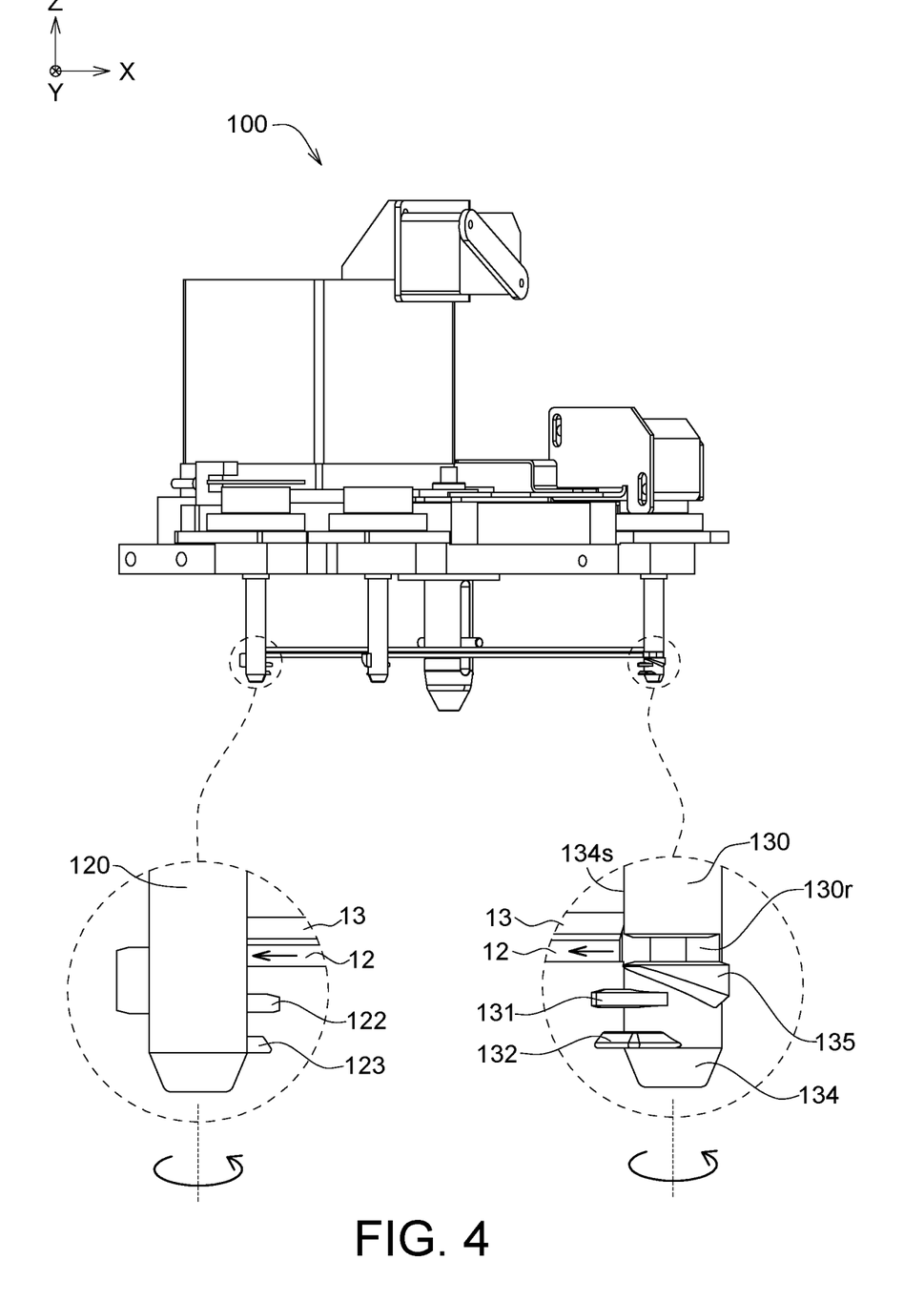
FIGS. 4 and 5 are schematic diagrams showing the first rod and the second rod of the disc grabbing apparatus rotating to the first state from the third state according to an embodiment of the invention.
Figure 5:
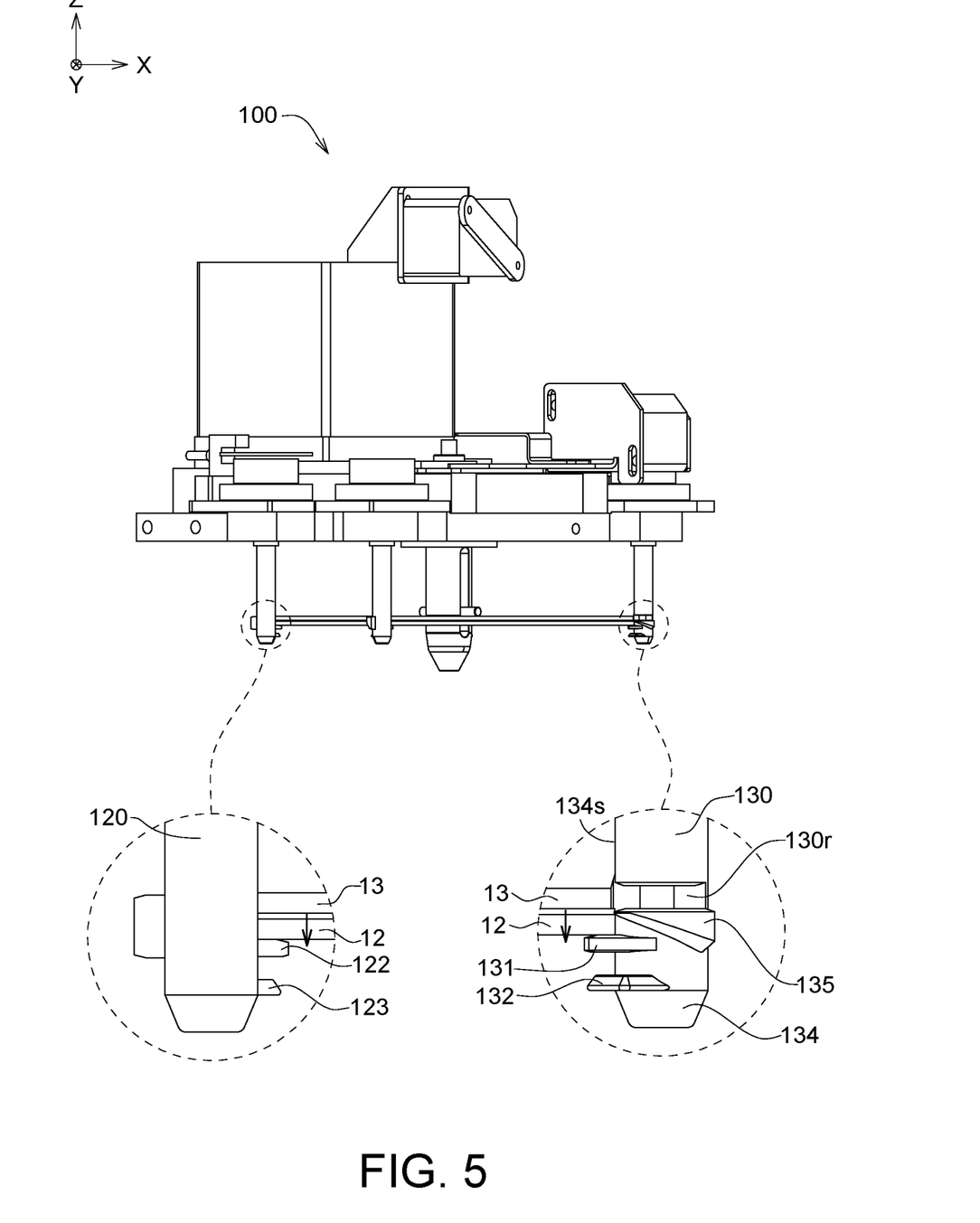

Referring to FIGS. 4 and 5, FIGS. 4 and 5 are schematic diagrams showing the first rod 120 and the second rod 130 of the disc grabbing apparatus 100 rotating to the first state from the third state according to an embodiment of the invention.

As illustrated in FIG. 4, during the process of the first rod 120 and the second rod 130 rotating to the first state from the third state in a second rotational direction, the first groove 130*r* is rotated to face away from the disc region DR, such that the disc 12 located within the disc region DR is detached from the first groove 130*r*, and the peripheral surface 134*s* of the second rod 130 could push the disc 12 to move toward the first rod 120 (the direction of the arrow) for pushing the disc 12 to return back to the position of FIG. 1D. The second rotational direction is opposite to the first rotational direction, and the second rotational direction is, for example, a counterclockwise direction. Furthermore, during the process of the first rod 120 and the second rod 130 rotating to the first state from the third state, the pushing portion 121 is rotated to be outside the disc region DR from being located within the disc region DR for releasing the disc 12. When the disc 12 is released, the disc 12 and the disc 13 located above it are dropped downward to the first supporting portion 122 and the second supporting portion 131 (in the direction of the arrow), as illustrated in FIG. 5.

As illustrated in FIG. 5, during the process of the first rod 120 and the second rod 130 rotating to the first state from the third state, the first supporting portion 122 and the second supporting portion 131 are rotated to be inside the disc region DR from being outside the disc region DR for carrying the disc 12 and the disc 13 which drop from the top. As illustrated in FIG. 5, in the first state, all the discs located in the disc grabbing apparatus 100 are supported by the first supporting portion 122 and the second supporting portion 131 and there is no disc located in the first groove 130*r*.

In summary, in a disc separating process, the disc grabbing apparatus 100 could use the separating portion 135, the pushing portion 121 and the first groove 130*r* to separate the disc 11 from the disc 12, then assigns the disc 11 to the optical disc drive 20, then returns back the first state from the third state to carry the remaining discs. According to this principle, the disc grabbing apparatus 100 could sequentially grab a number of discs to a number of optical disc drives by using a number of disc separating processes, wherein one disc is fed to one optical disc drive. In the disc separating process, the disc grabbing apparatus 100 uses the first supporting portion 122, the second supporting portion 131, the third supporting portion 123 and the fourth supporting portion 132 to support the disc surface of the disc instead of clamping the edge of the disc. In long-term operation, such way will not cause damage to the outer edge of the disc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A disc grabbing apparatus, comprising:
   a body comprising a central shaft;
   a first rod comprising a pushing portion and a first supporting portion which are sequentially disposed from top to bottom;
   a second rod comprising a first groove and a second supporting portion which are sequentially disposed from top to bottom;
   wherein the first rod and the second rod define a disc region therebetween with respect to the central shaft which is inserted into a disc center hole; when the first rod and the second rod are in a first state, the pushing portion is located outside the disc region and the first groove faces away from the disc region; when the first rod and the second rod rotate to a second state from the first state in a first rotational direction, the pushing portion is located within the disc region and the first groove faces the disc region.

2. The disc grabbing apparatus as claimed in claim 1, wherein when the first rod and the second rod are in the first state, the first supporting portion and the second supporting portion are located within the disc region; when the first rod and the second rod rotate to the second state from the first state, the first supporting portion and the second supporting portion are located outside the disc region.

3. The disc grabbing apparatus as claimed in claim 1, wherein the first rod further comprises a third supporting portion, and the pushing portion, the first supporting portion and the third supporting portion are sequentially disposed from top to bottom; the second rod further includes a fourth supporting portion, and the first groove, the second supporting portion and the fourth supporting portion are sequentially disposed from top to bottom; when the first rod and the second rod rotate to the second state from the first state, the third supporting portion and the fourth supporting portion are located within the disc region.

4. The disc grabbing apparatus as claimed in claim 3, wherein when the first rod and the second rod rotate to a third state from the second state in the first rotational direction, the third supporting portion and the fourth supporting portion rotate to be outside the disc region from being inside the disc region.

5. The disc grabbing apparatus as claimed in claim 3, wherein when the first rod and the second rod rotate to a third state from the second state in the first rotational direction, the pushing portion is located within the disc region and the first groove faces the disc region.

6. The disc grabbing apparatus as claimed in claim 3, wherein when the first rod and the second rod rotate to the first state from a third state in a second rotational direction, the pushing portion is located outside the disc region and the first groove faces away from the disc region.

7. The disc grabbing apparatus as claimed in claim 6, wherein when the first rod and the second rod rotate to the first state from the third state in the second rotational direction, the first supporting portion and the second supporting portion are located within the disc region.

8. The disc grabbing apparatus as claimed in claim 3, wherein the third supporting portion and the fourth supporting portion have a first carrying surface and a second carrying surface, respectively, wherein the first carrying surface is substantially coplanar with the second carrying surface.

9. The disc grabbing apparatus as claimed in claim 3, wherein the first rod further includes a first rod body, wherein the pushing portion, the first supporting portion and the third supporting portion are disposed on the first rod body and are projected with respect to a peripheral surface of the first rod body.

10. The disc grabbing apparatus as claimed in claim 3, wherein the second rod further includes a second rod body, wherein the first groove is recessed with respect to a peripheral surface of the second rod body, while the second supporting portion and the fourth supporting portion are disposed on the second rod body and projected with respect to the peripheral surface of the second rod body.

11. The disc grabbing apparatus as claimed in claim 1, wherein the central shaft comprises a second groove; when the first rod and the second rod rotate to the second state from the first state, the second groove faces the pushing portion.

12. The disc grabbing apparatus as claimed in claim 1, wherein the second rod comprises a separating portion, and the first groove, the separating portion, the second supporting portion and the fourth supporting portion are sequentially disposed from top to bottom, and the separating portion is projected with respect to the first groove.

13. The disc grabbing apparatus as claimed in claim 12, wherein the separating portion has a wedge shape with a tip end, when the first rod and the second rod rotate to the second state from the first state in the first rotational direction, the tip end of the separating portion is inserted into a gap between two adjacent discs.

14. The disc grabbing apparatus as claimed in claim 1, further comprising two first rods disposed adjacent to each other and two second rods disposed adjacent to each other.

15. The disc grabbing apparatus as claimed in claim 1, wherein a carrying surface of the first supporting portion and a carrying surface of the second supporting portion are substantially coplanar with each other.

16. The disc grabbing apparatus as claimed in claim 1, further comprising a driving mechanism to drive the first rod and the second rod to rotate in the first rotational direction synchronously.

17. The disc grabbing apparatus as claimed in claim 1, wherein when the first rod and the second rod rotate to the second state from the first state in the first rotational direction, the pushing portion is in contact with an outer edge of a disc to push the disc to move toward the first groove and the first groove receives the outer edge of the disc.

* * * * *